United States Patent [19]

Hagiwara

[11] Patent Number: 4,739,255
[45] Date of Patent: Apr. 19, 1988

[54] METHOD FOR ANALYZING THINLY BEDDED SAND/SHALE FORMATIONS

[75] Inventor: Teruhiko Hagiwara, Houston, Tex.

[73] Assignee: Shell Oil Company, Houston, Tex.

[21] Appl. No.: 867,976

[22] Filed: May 29, 1986

[51] Int. Cl.$^4$ .............................................. E21B 49/00
[52] U.S. Cl. ...................................... 324/152; 324/339
[58] Field of Search ................... 73/152, 151; 324/339, 324/323; 364/422

[56] References Cited

U.S. PATENT DOCUMENTS

| | | | |
|---|---|---|---|
| 3,895,289 | 7/1975 | Rickey et al. | 73/152 X |
| 4,314,339 | 2/1982 | Kenyon | 364/422 |
| 4,482,959 | 11/1984 | Minne | 364/422 |
| 4,495,604 | 1/1985 | Dumanoir | 73/152 X |
| 4,584,874 | 4/1986 | Ruhovets | 73/152 |

OTHER PUBLICATIONS

*Log Interpretation*, vol. I, *Principles*, Schlumberger Limited, 1972.

E. A. Vajnar et al., Surprising Productivity from Low–Resistivity Sands, SPWLA, 18th Annual Symposium, Jun. 5–8, 1977.

J. C. Gauntt et al., The Use of Core Analysis Data . . . Central Oklahoma, SPWLA 4th Annual Symposium, May 23–24, 1963.

*Primary Examiner*—Stewart J. Levy
*Assistant Examiner*—Kevin D. O'Shea

[57] ABSTRACT

A parallel conductance model of thinly laminated sand/shale sequences utilizes a sand/shale ratio, such as from a borehole televiewer or microelectric scanning tool, to derive sand layer resistivity from otherwise featureless logs of such thinly laminated formations.

8 Claims, 7 Drawing Sheets

METHOD FOR ANALYZING THINLY BEDDED SAND/SHALE FORMATIONS

BACKGROUND OF THE INVENTION

The present invention relates to methods for analyzing earth formations, and more particularly to methods for analyzing subterranean formations comprising alternating thin layers of sand and shale, for determining if producible quantities of hydrocarbons may be present.

In the search for oil and gas deposits, one of the most important and powerful methods for analyzing earth formations penetrated by a borehole is to lower various measuring instruments into the borehole to make various electrical, mechanical, magnetic, nuclear, acoustical, etc., measurements. However, as powerful and sophisticated as these various techniques and tools have become, their resolution is not infinite. In fact, a great deal of effort has understandably been expended to define clearly just what the various tool responses mean. The several companies offering borehole logging services, for example, typically furnish considerable literature, conversion charts, and so forth, to aid in interpreting the tool responses according to the particular formation characteristics at hand.

As an important example having particular reference to the present invention, many hydrocarbon reservoirs having economically important reserves are difficult to evaluate because in their vertical extent they are extremely thin. Even worse, these thin layers may alternate with layers which are not economically producible but produce nearly identical responses on the logging tool. For example, evaluation of thin zones using induction logs is a problem when the zone thickness is less than the vertical resolution of the tool (typically 3 to 6 feet in the case of a deep induction log). The problem is particularly acute when logging in a laminated sand/shale sequence as the log response in such a formation shows essentially no character, and the resistivity of any layer or set of layers is thus not determined. Accordingly, a considerable need exists for a method for accurately analyzing thinly bedded sand/shale formations, and in particular for estimating the average sand resistivity thereof, so that the average fluid content of the sand in such intervals of interest can be determined.

SUMMARY OF THE INVENTION

Briefly, the present invention meets the above needs and purposes with a new and improved method for analyzing thinly bedded sand/shale formations penetrated by a borehole. Such thinly laminated sand/shale sequences are common, for example, in delta fringe and turbidite deposits. As taught by the present invention, it has been found that in a very thinly laminated formation, for example when the lamina have thicknesses of about 4 inches or less, the induction log reads a constant average conductivity of the formation as:

$$\sigma_{formation} = h_{sand} \times \sigma_{sand} + h_{shale} \times \sigma_{shale} \quad (1)$$

where $\sigma_{sand}$ and $\sigma_{shale}$ are the conductivity of the sand and shale lamina, respectively. In solving this equation for the resistivity of the sand (which is the inverse of the sand conductivity), it will be observed that $h_{sand}/h_{shale}$ is the sand/shale composition ratio of the formation, and that h is the normalized height of the layers in the formation intervals such that $h_{sand}$ plus $h_{shale}$ equals 1. Thus, once the shale resistivity and the sand/shale ratio are known, the average sand resistivity can be readily determined.

In a preferred embodiment, therefore, the values of the shale resistivity, the formation conductivity, and the sand/shale ratio for each formation interval of interest are first determined. The shale resistivity is commonly estimated using known methods, or it can be determined from core samples, etc. The formation conductivity is typically determined by means of an induction log measurement, although other known methods may again be used. The sand/shale ratio may be determined from cores of the intervals of interest, from borehole televiewer measurements, from measurements with a Microelectric Scanning Tool, etc. Next, the average sand resistivity for each interval of interest is then determined using equation (1) (above). Knowing this, the average fluid content (e.g., hydrocarbon/water ratio) is readily determined using known methods.

It is therefore an object of the present invention to provide a new and improved method for analyzing thinly bedded sand/shale formations penetrated by a borehole; such a method which can be readily performed using readily available borehole logging and evaluation equipment; in which the values are first determined for the shale resistivity, the formation conductivity, and the sand/shale ratio in the formation intervals of interest; in which the average sand resistivity is then determined from a parallel conductance model of the formation in which the formation conductivity is equated to the product of the normalized sand height times the sand conductivity plus the normalized shale height times the shale conductivity; and to accomplish the above objects and purposes in an inexpensive, uncomplicated, versatile and reliable method which, while inexpensive and straightforward, is accurate and readily suited to providing important formation evaluation information previously unavailable.

These and other objects and advantages of the invention will be apparent from the following description, the accompanying drawings, and the appended claims.

DESCRIPTION OF THE PREFERRED EMBODIMENTS

With reference to the drawings, the new and improved method for analyzing thinly bedded sand/shale formations penetrated by a borehole will now be described.

As suggested above, the present invention, in essence, analyzes the thinly laminated formations by treating each as an independent conductor, and then considering the total conductivity of the formation to be the sum of the parallel circuit conductivities of the separate individual layers. This is represented mathematically by equation (1) which was presented earlier.

It appears that this model can hold for a dipping formation and/or a deviated borehole, if the dip angle is less than about 45 degrees, and preferably less than 30 degrees. This observation can make the induction log interpretation of a thinly laminated formation quite straightforward. One can estimate the average sand resistivity based on the parallel conductance model once the shale resistivity and the sand/shale ratio are known.

The following examples from computer simulated formations illustrate the invention in detail.

(a) Effect of Layer Thickness

Figure 1A:
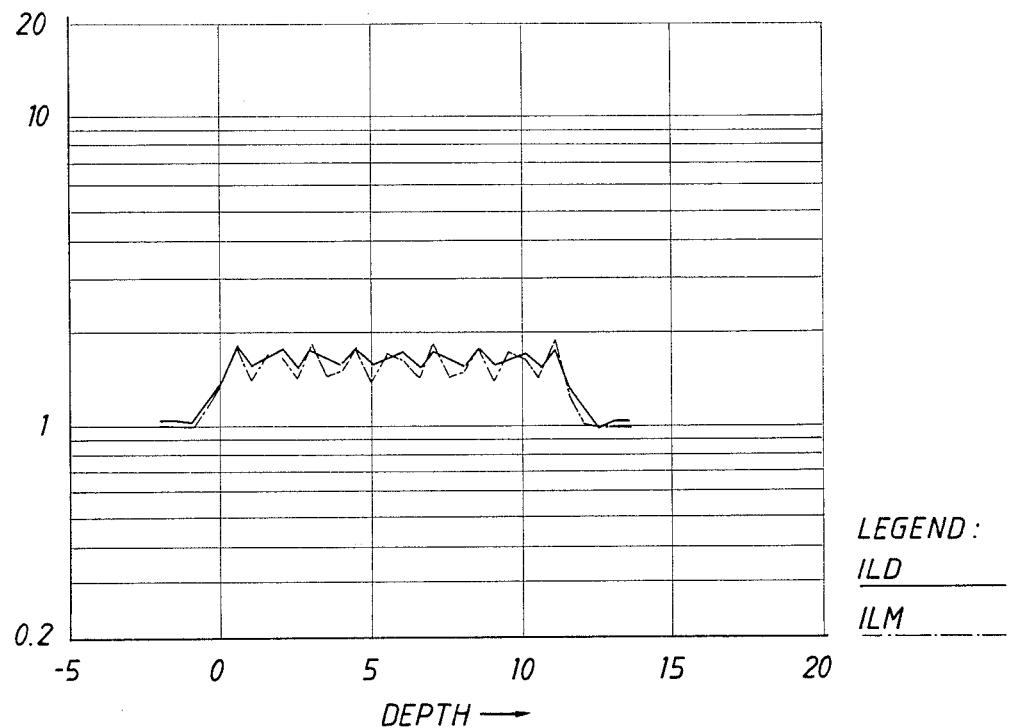
FIG. 1A shows the log responses to thinly laminated formations having a layer thickness of 40 cm.
Figure 1B:
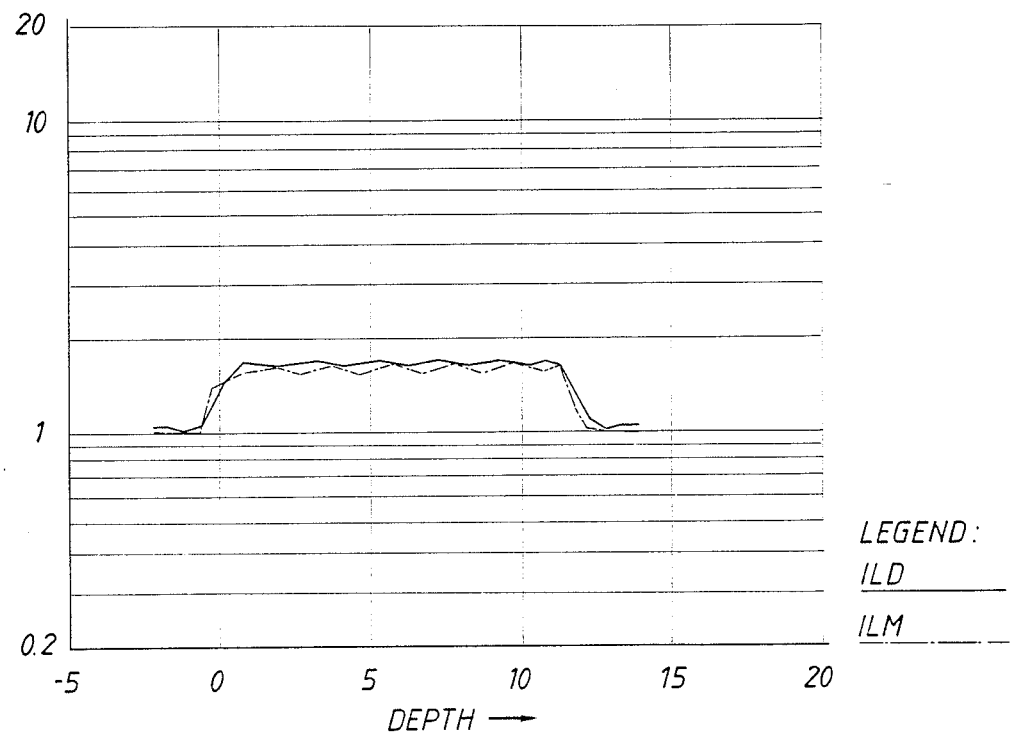
FIG. 1B is an illustration similar to FIG. 1A wherein the layer thickness is 20 cm.
Figure 1C:
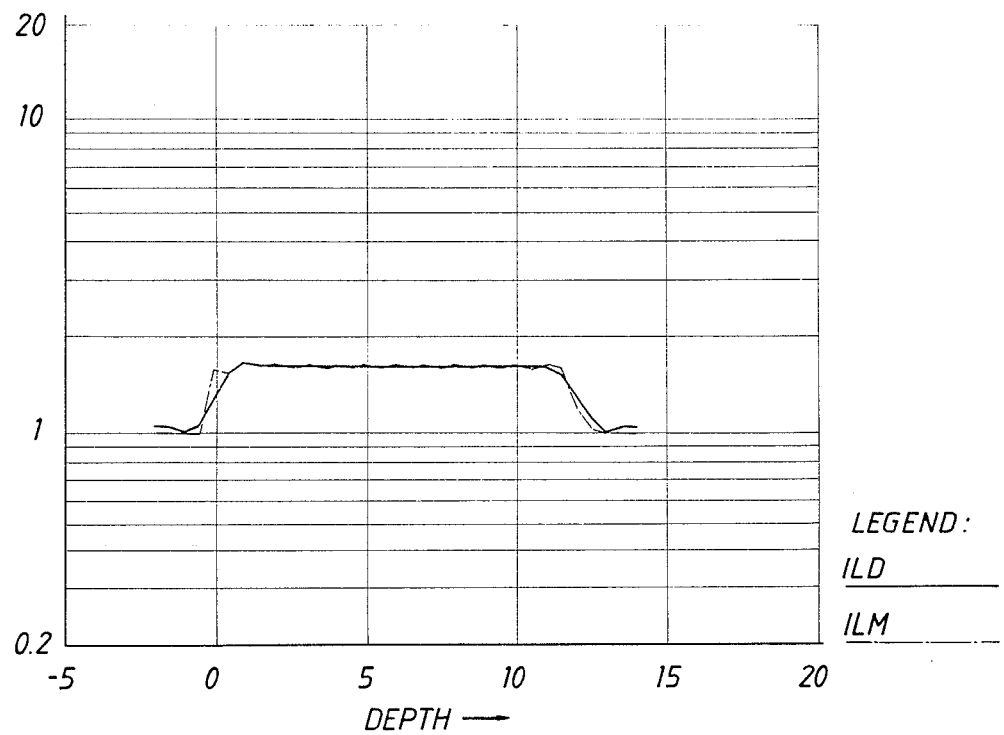
FIG. 1C is an illustration similar to FIGS. 1A and 1B wherein the layer thickness is 10 cm.

Plotted in FIGS. 1a, b, and c are the log responses (ILD/ILM) to thinly laminated formations where the sand and the shale resistivities are 5 and 1 ohm-m, respectively. The sand/shale ratio is 0.50/0.50 ($h_{sand}$=$h_{shale}$). The thickness of both sand and shale layers are the same and constant throughout the formation. FIG. 1a shows the response when the layer thickness is 40 cm (about 1.3'). Similarly, FIGS. 1b, and c, are responses to the 20 cm (about 8") and 10 cm (about 4") thick layers.

It is immediately obvious from these Figures that (1) when the layer thickness is about 1' in a multi-layered formation, the induction log resistivity not only fluctuates but also is far different from the true resistivity of any of the constituent layers, (2) the number of resistivity cycles is not equal to the number of layers when the layers are about 1' thick, and (3) when the layer thickness is about 10 cm (4"), the induction log has essentially no character and reads nearly constant resistivity of about 1.65 ohm-m (or, a conductivity of 0.6 mho/m), which is very close to the average resistivity of the formation if the layers form a parallel resistivity circuit. Or, in the terms of conductivity, the log reads the average conductivity, $$\sigma_f = 0.5 \times \sigma_{sand} + 0.5 \times \sigma_{shale} = 0.5 \times 1/5 + 0.5 \times 1/1 = 0.6. \quad (2)$$

Figure 2A:
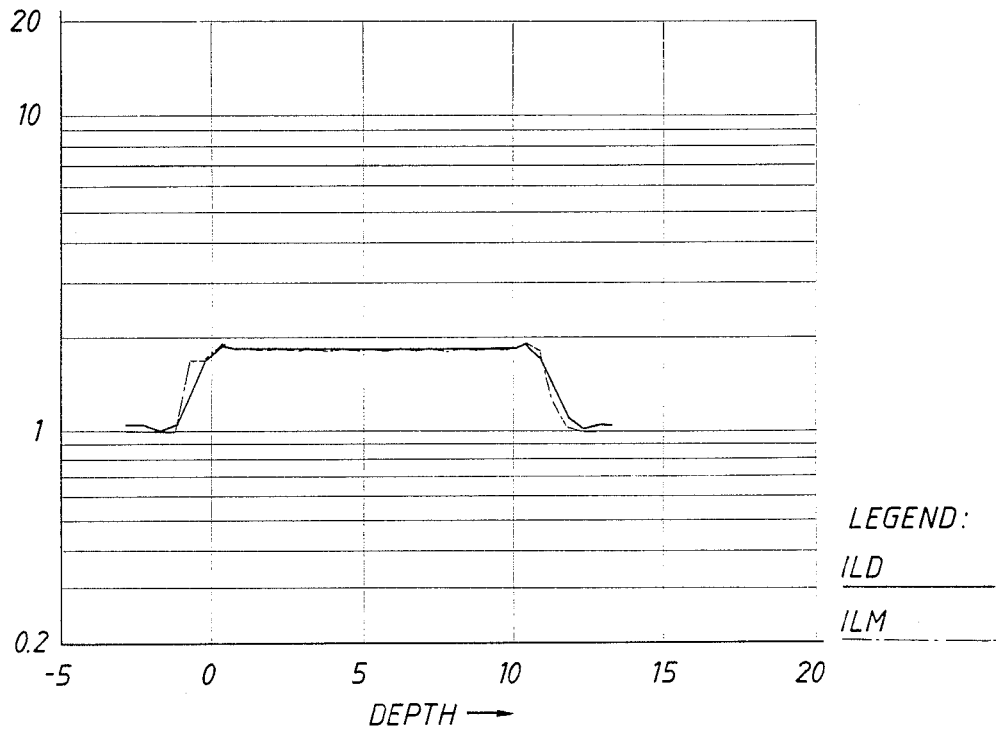
FIG. 2A is an illustration similar to FIG. 1C wherein the thickness is 10 cm but the resistivity of the sand is greater.
Figure 2B:
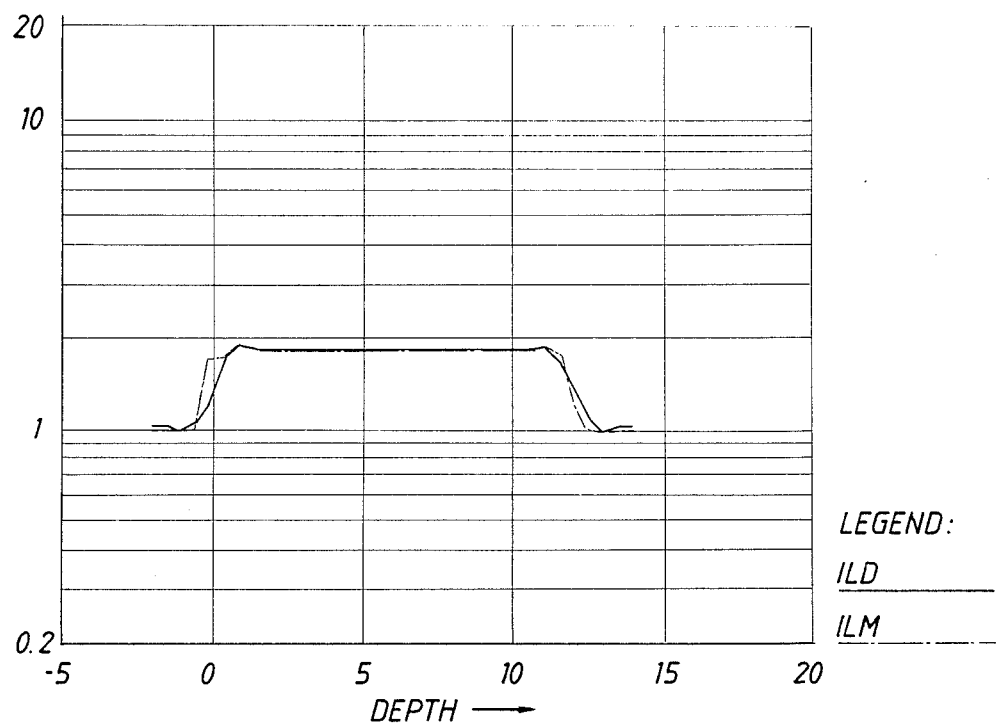
FIG. 2B is an illustration similar to FIG. 2A in which the sand thickness is 5 cm.
Figure 5:
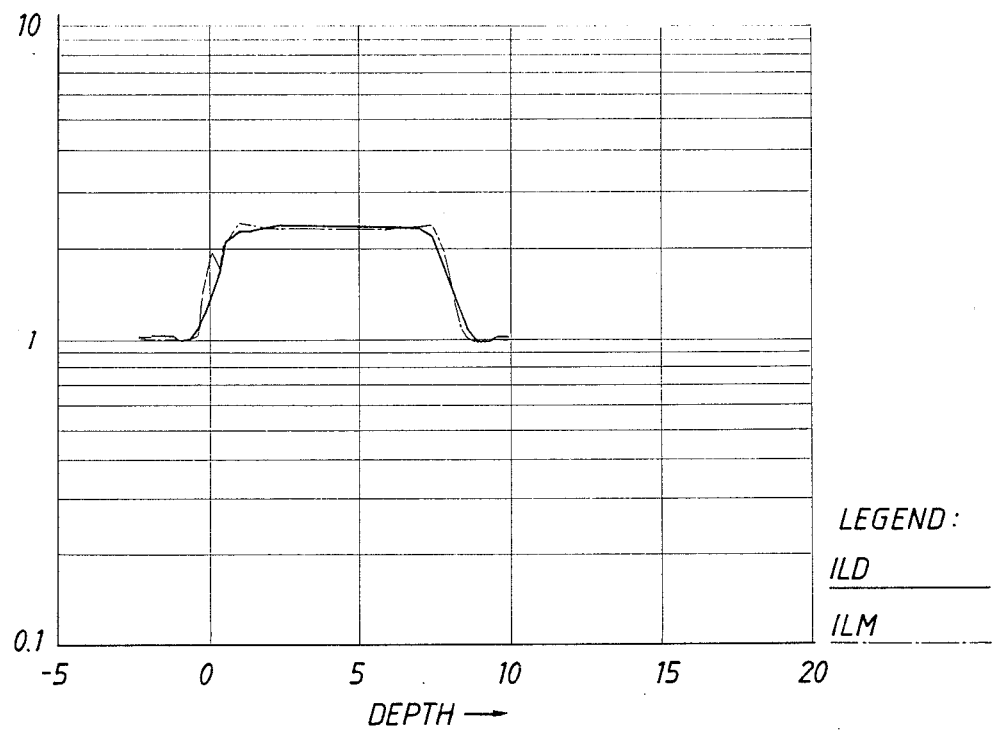
FIG. 5, for comparison purposes, illustrates the response of a similar, but single, homogeneous formation.

Plotted in FIG. 2 are the log (ILD/ILM) responses when the sand resistivity is 20 ohm-m, and the thickness of each layer is 10 cm (about 4") in FIG. 2a and 5 cm (about 2") in FIG. 2b. Again, the log reads a constant resistivity of 1.89 ohm-m or constant conductivity of 0.53 mho/m which is very close to the average conductivity of the formation $$\sigma_f = 0.5 \times 1/20 + 0.5 \times 1/1 = 0.53. \quad (3)$$

Figure 3:
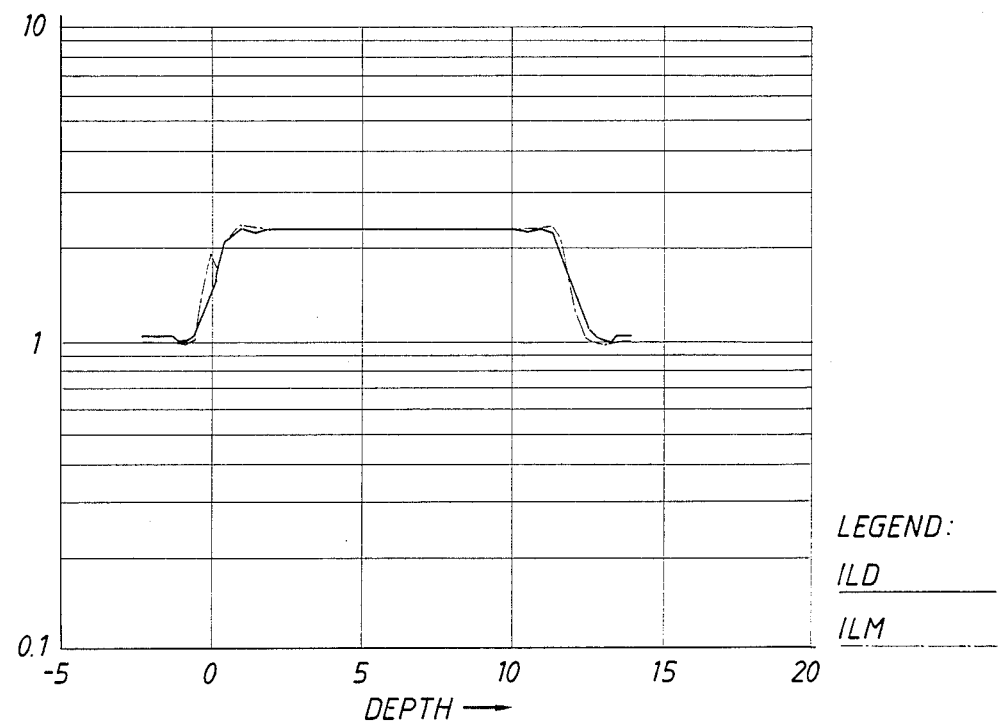
FIG. 3 is an illustration similar to FIGS. 2A and 2B wherein the sand/shale ratio is 60/40 and each sand and shale layer is 6 cm and 4 cm thick, respectively.

Shown in FIG. 3 is the ILD/ILM response where the sand/shale ratio is 60/40 and each sand and shale layer is 6 cm and 4 cm thick, respectively. The sand and shale layer resistivities are the same as in FIG. 2. The log again reads a constant resistivity of 2.30 ohm-m or conductivity of 0.44 mho/m, which should be compared with the average conductivity of a parallel conductance circuit, $$\sigma_f = 0.6 \times 1/20 + 0.4 \times 1/1 = 0.43 \text{ mho/m} \quad (4)$$

(b) Effect of Lamination Pattern

Figure 4A:
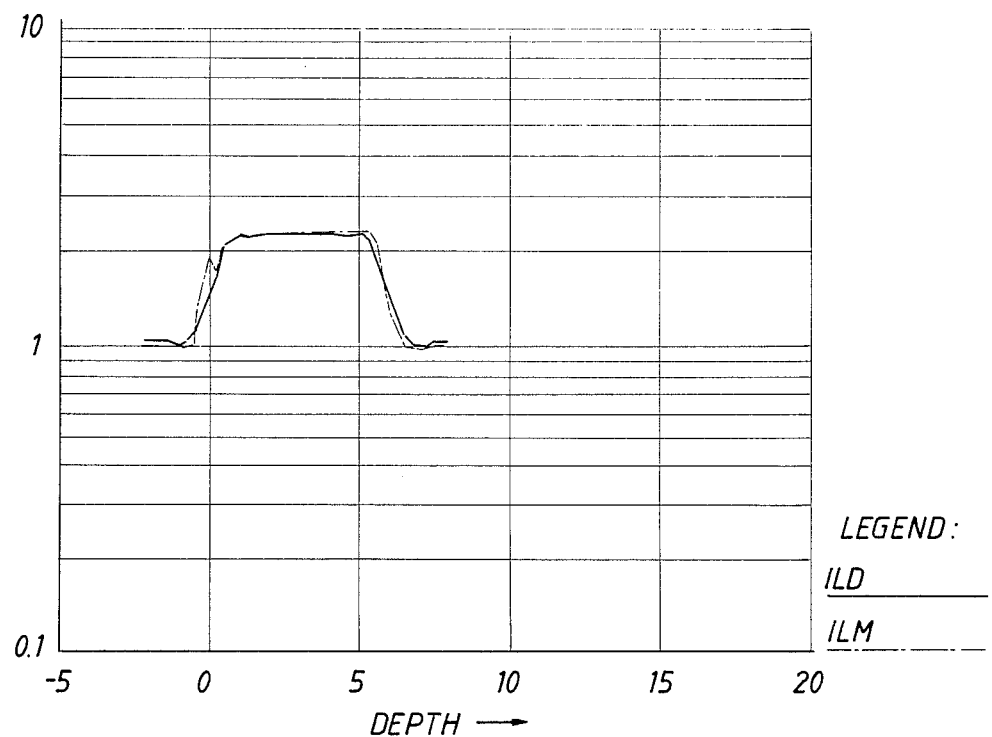
FIG. 4A depicts a log response showing the effect of the lamination pattern.

Plotted in FIG. 4a is the log response in a laminated formation where the sand/shale ratio and the resistivities of each sand and shale layer are the same as in FIG. 3. However, in FIG. 4a, the formation is made of 40 units of 6-4-1.5-1-1.5-1 cm sand/shale unit sequence with the sand/shale ratio fixed at 60/40. The fact that the log still reads the identical resistivity of 2.30 ohm-m in both formations, despite the change in the layering pattern, suggests that the details of layering pattern does not affect the log resistivity once the sand/shale ratio is fixed, and the individual layers are sufficiently thin.

(c) Effect of Formation Thickness

Figure 4B:
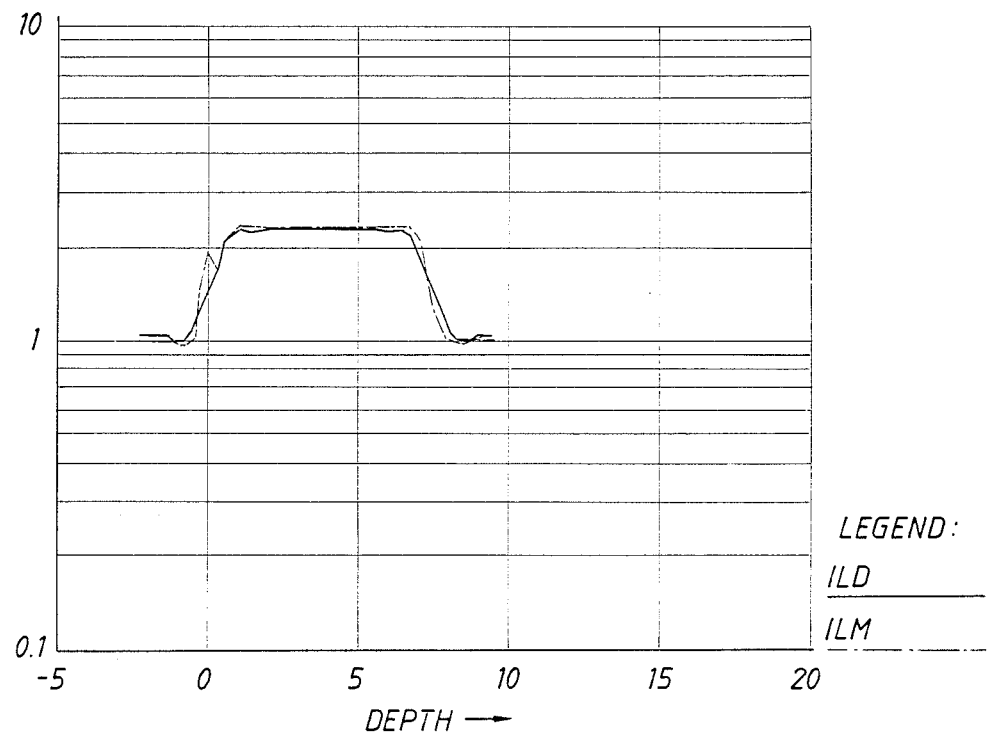
FIG. 4B illustrates the effect of formation thickness.

Plotted in FIG. 4b are the log responses in similar formations where the sand/shale unit sequence is the same as in FIG. 4a. The total formation thickness is about 6 m (40 units) in FIG. 4a, and 8 m (60 units) in FIG. 4b. The induction log can obviously identify the constant average conductivity of 0.43 mho/m once the formation is thicker than 6 m (about 20 feet).

For comparison, the log response to a single homogeneous formation of 2.33 ohm-m resistivity (0.43 mho-m conductivity) is plotted in FIG. 5. The response appears practically identical to the response in a thinly laminated formation of the same average conductivity as in FIG. 4.

To summarize, when a formation is thicker than about 6 m (about 20 feet) and the formation is thinly laminated with each lamina thinner than about 10 cm (4 inches), the induction log reads a constant average conductivity of the formation which is determined by the conductivity of the sand and shale layers and the sand/shale ratio alone.

The invention can be used to accurately estimate the resistivity of the sand layers in a thinly laminated formation if the laminations are not thick (less than about 4"), and if the shale resistivity can be reasonably estimated. The estimation of the sand/shale ratio can be determined from core inspection if cores are available. The borehole televiewer or microelectric scanning tool logs can also be used to determine the ratio and average layer thickness.

GULF COAST EXAMPLE

Using the invention to model a thinly laminated sand/shale formation found in the Gulf Coast (FIG. 6), we first observe that, according to core photos, the zone between xx910 feet and xx070 feet depth is a thinly laminated sand/shale sequence. There are typically more than 16-20 layers per foot and the thickest lamina is hardly thicker than 1". On the other hand, the induction log shows two nearly constant resistivities in the same interval: about 2.5 ohm-m in the lower zone below.

Close inspection of cores suggests that the sand/shale ratio is about 61/39 in the upper zone and 53/47 in the lower.

According to the present invention, for such a thinly laminated formation the true sand resistivity is estimated to be about 5.25 ohm-m in the upper zone (with the sand/shale ratio of 60/40), and 1.21 ohm-m in the lower zone (with 50/50 sand/shale ratio), where the shale resistivity is assumed to be 1.4 ohm-m from the log response in adjacent shale formations.

Figure 6A:
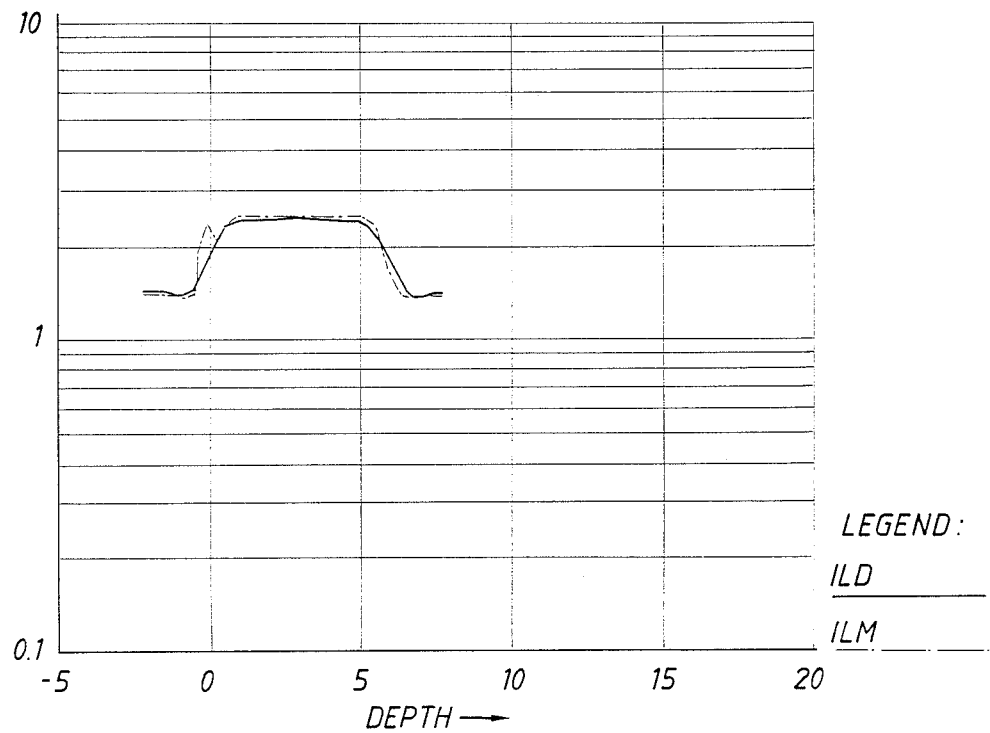
FIG. 6 present a model of an actual thinly laminated sand/shale formation found in the Gulf Coast, FIG. 6A presenting a computed synthetic induction log in one zone, FIG. 6B presenting a similar log for another zone and using a different estimated resistivity, and FIG. 6C plotting the response to a combined formation of the two zones from FIGS. 6A and 6B.
Figure 6B:
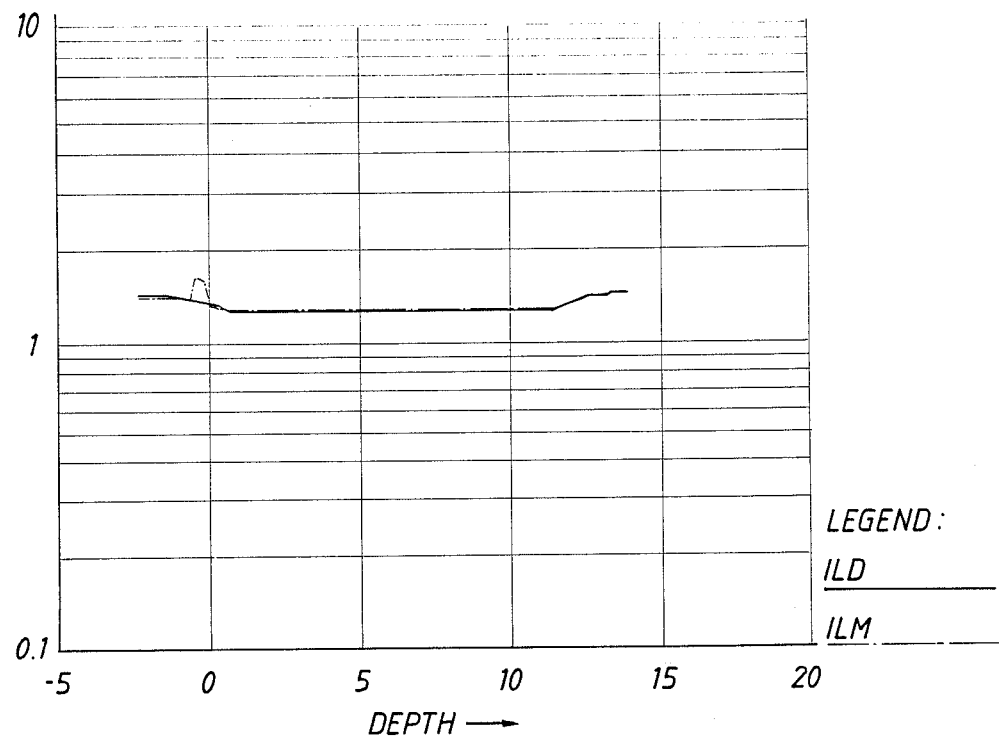
Figure 6C:
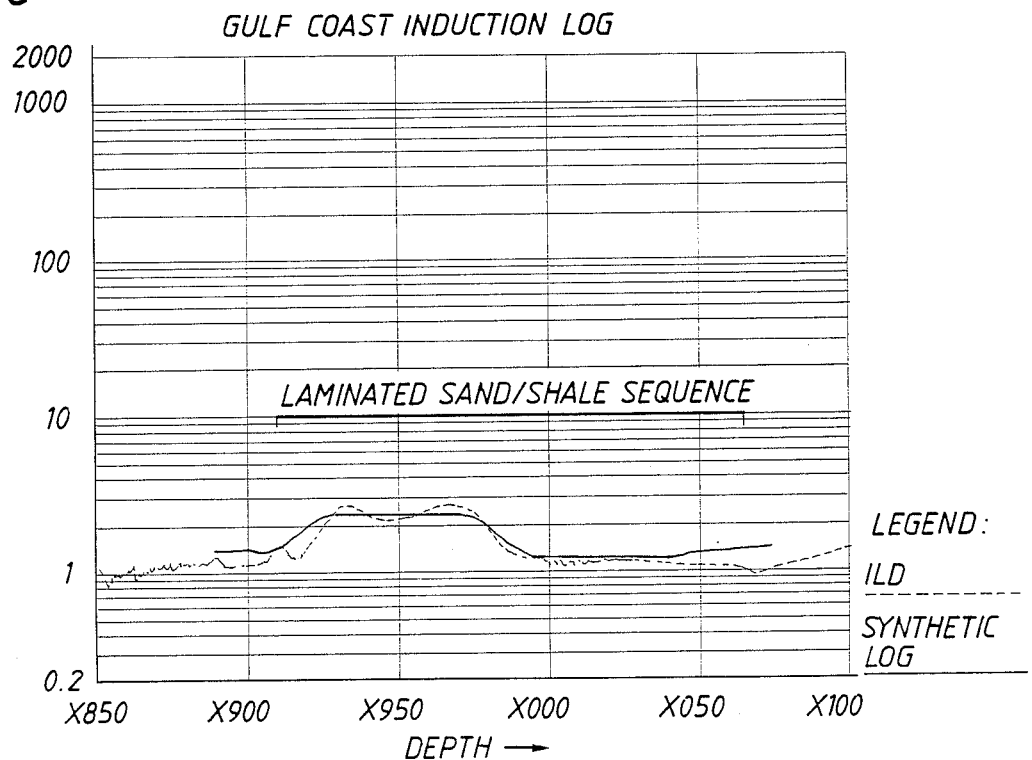

To confirm this estimation, a synthetic induction log was computed in a thinly laminated formation, assuming the sand resistivity of 5.25 ohm-m (1.21 ohm-m) and the sand/shale ratio of 60/40 (50/50), and the result was plotted in FIGS. 6a (6b). The synthetic log resistivity in FIG. 6a is 2.48 ohm-m, which is almost identical to the actual log resistivity in the upper zone. In FIG. 6b, the log resistivity was estimated to be 1.28 ohm-m in the lower zone, which is again very close to the actual log resistivity. Plotted in FIG. 6c is the response to a combined formation of two zones from FIGS. 6a and 6b and the actual ILD log for comparison.

According to the invention, therefore, for thinly laminated formations, the true sand resistivity is estimated as 5.25 ohm-m in the upper zone and 1.21 ohm-m in the lower zone. Using reasonable estimates of the Archie model parameters, a water saturation is 22% in the upper zone. This value is consistent with available capillary pressure data.

INDUCTION LOG RESPONSE TO DIPPED LAMINATED FORMATIONS

The effect of dip on the log response appears insignificant as long as the dip angle is less than about 30 degrees. In general, the largest effect of dip is when the formation is not very thick. In that case, adjacent zones lie within the tool's investigation range, and the log resistivity is again a hybrid value of several layer's resistivity. Consequently, when the formation is laminated but is thick as a whole, and the dip angle is not large, the effect from dip should be small.

Figure 7A:
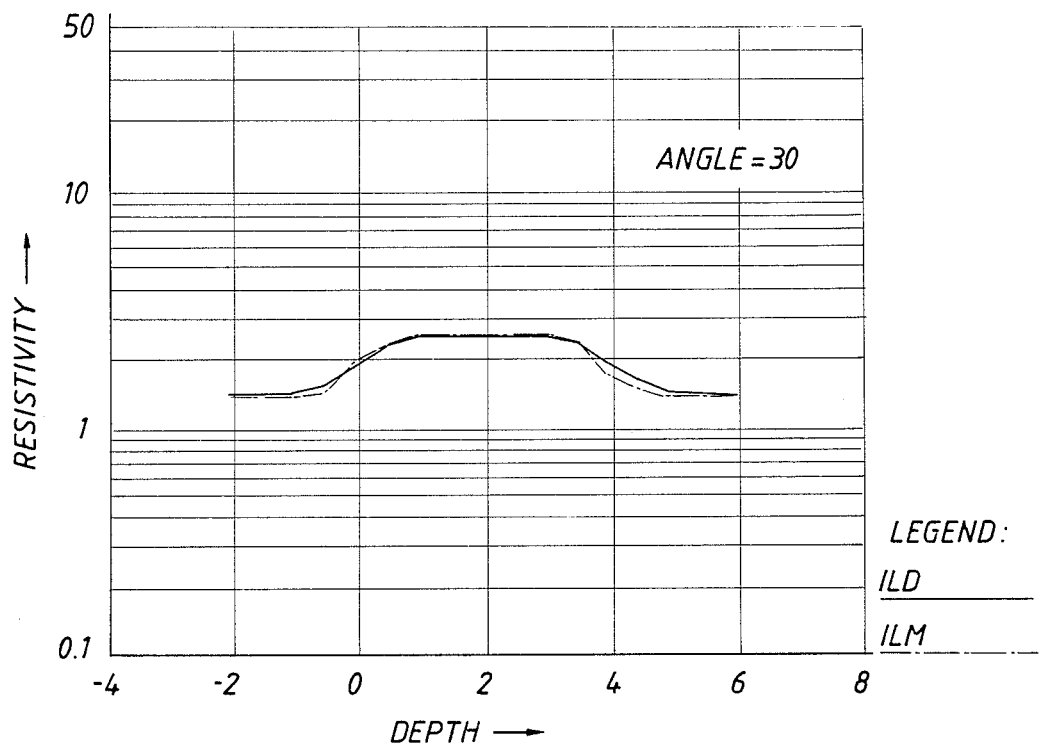
FIGS. 7A and 7B illustrate the log response to dipped laminated formations, log responses to the FIG. 6A formation being computed respectively for dipping angles of 30 degrees and 45 degrees.
Figure 7B:
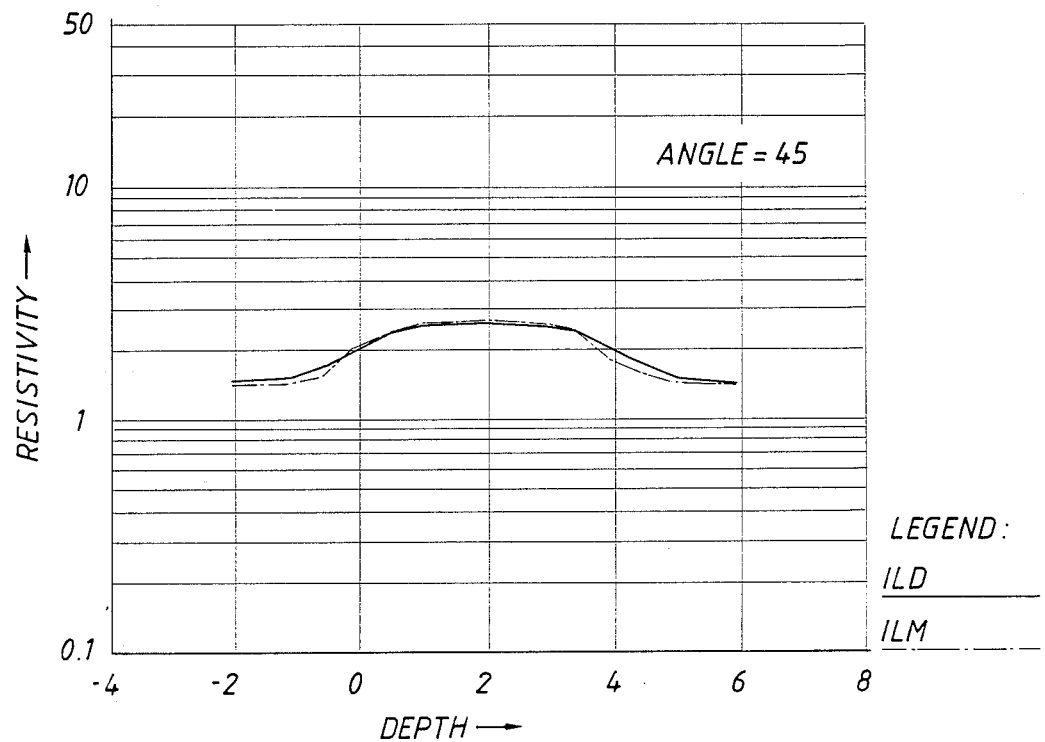

This is indeed the case as shown in FIGS. 7a and b where the log responses to the same formation of FIG. 6a were computed when the dipping angle is 30 degrees and 45 degrees. The log resistivity is about 2.4 ohm-m, which is not much different from 2.5 ohm-m at a horizontal formation. This reduction may be partially due to the relatively thin formation thickness of the model and the difference may disappear when the formation is much thicker.

While the methods herein described constitute preferred embodiments of the invention, it is to be understood that the invention is not limited to these precise methods, and that changes may be made therein without departing from the scope of the invention.

What is claimed is:

1. A method for analyzing thinly bedded sand/shale formations penetrated by a borehole to determine the average sand conductivity thereof, comprising:
   determining values for the shale conductivity, the formation conductivity, and the sand/shale ratio in the formation intervals of interest; and
   determining the average sand conductivity from the relationship:

$$\sigma_{formation} = h_{sand} \times \sigma_{sand} + h_{shale} \times \sigma_{shale}$$

where $\sigma$ is conductivity, and h is the normalized height of the layers in the formation intervals, such that $h_{sand} + h_{shale} = 1$.

2. The method of claim 1 wherein said step of determining the formation conductivity further comprises determining the formation conductivity by means of an induction log measurement.

3. The method of claim 1 wherein said step of determining the shale conductivity further comprises estimating the shale conductivity.

4. The method of claim 1 wherein said step of determining the sand/shale ratio further comprises determining the sand/shale ratio from cores of the intervals of interest.

5. The method of claim 1 wherein said step of determining the sand/shale ratio further comprises determining the sand/shale ratio by means of borehole televiewer measurements.

6. The method of claim 1 wherein said step of determining the sand/shale ratio further comprises determining the sand/shale ratio by means of measurements with a microelectric scanning tool.

7. The method of claim 1 further comprising determining the average fluid content of the sand in the intervals of interest.

8. A method for analyzing thinly bedded sand/shale formations penetrated by a borehole to determine the average sand conductivity thereof, comprising:
   determining values for the shale conductivity, the formation conductivity, and the sand/shale ratio in the formation intervals of interest, the shale conductivity being estimated, the formation conductivity being determined by means of an induction log measurement, and the sand/shale ratio being determined by means of borehole televiewer measurements;
   determining the average sand conductivity for each such interval from the relationship:

$$\sigma_{formation} = h_{sand} \times \sigma_{sand} + h_{shale} \times \sigma_{shale}$$

where $\sigma$ is conductivity, and h is the normalized height of the layers in the formation intervals, such that $h_{sand} + h_{shale} = 1$; and
   determining the average fluid content of the sand in the interval of interest.

* * * * *